US006349504B1

(12) United States Patent
Schmitt

(10) Patent No.: US 6,349,504 B1
(45) Date of Patent: Feb. 26, 2002

(54) WINDOW LIFT BRACKET

(75) Inventor: Karl R. Schmitt, Rockford, IL (US)

(73) Assignee: ELCO Textron, Inc., Rockford, IL (US)

( * ) Notice: Subject to any disclaimer, the term of this patent is extended or adjusted under 35 U.S.C. 154(b) by 11 days.

(21) Appl. No.: 09/618,518

(22) Filed: Jul. 18, 2000

Related U.S. Application Data

(60) Provisional application No. 60/160,102, filed on Oct. 18, 1999.

(51) Int. Cl.$^7$ .................................................. B60J 1/10
(52) U.S. Cl. ........................................ 49/375; 52/127.3
(58) Field of Search .......................... 49/351, 375, 358; 428/122; 52/127.3

(56) References Cited

U.S. PATENT DOCUMENTS

| | | | | | |
|---|---|---|---|---|---|
| 4,026,088 | A | | 5/1977 | Akabane | |
| 4,449,326 | A | | 5/1984 | Hori et al. | |
| 4,663,901 | A | | 5/1987 | Ichinohe | |
| 4,762,904 | A | * | 8/1988 | Nakama | 428/122 |
| 4,987,699 | A | | 1/1991 | Gold | |
| 4,991,351 | A | * | 2/1991 | Bertolini | 49/351 |
| 5,065,545 | A | | 11/1991 | Kane et al. | |
| 5,513,468 | A | | 5/1996 | Diestelmeier | |
| 5,515,651 | A | * | 5/1996 | Hofmann et al. | 49/375 |
| 5,546,704 | A | * | 8/1996 | Maruoka | 49/375 |
| 5,778,599 | A | * | 7/1998 | Saito | 49/375 |
| 5,987,820 | A | * | 11/1999 | Shibanushi | 49/375 |

FOREIGN PATENT DOCUMENTS

| | | |
|---|---|---|
| JP | 58-418 | 5/1983 |

* cited by examiner

*Primary Examiner*—Curtis A. Cohen
(74) *Attorney, Agent, or Firm*—Trexler, Bushnell, Giangiorgi, Blackstone & Marr, LTD

(57) ABSTRACT

A window lift bracket for attachment to a mounting edge of a movable window and which is connectable to a window lifting mechanism. The window lift bracket includes a base which is attachable to the window lifting mechanism and spaced apart portions extending from the base being positionable on either side of the movable window. The spaced apart portions define a channel therebetween. The window lift bracket includes at least one member, such as a flexible beam member, which is disposed generally in the channel for engaging the window when the window is disposed therein. Preferably, the engagement between the member and the window provides a reduced stress area at the bottom of the channel. Opposing surfaces of the spaced apart portions may provide convoluted surfaces, such as protrusions and depressions, which effectively increase the surface area to which the adhesive adheres, thereby improving the adhesion of the adhesive to the window bracket and the window.

19 Claims, 5 Drawing Sheets

WINDOW LIFT BRACKET

RELATED APPLICATION

This application claims the benefit of United States Provisional Application Serial No. 60/160,102, filed Oct. 18, 1999.

BACKGROUND

The present invention relates generally to a bracket for attachment to a movable window and connection to an automotive window lifting mechanism, and relates more specifically to a window bracket having at least one flexible beam which engages the window.

In vehicles, and especially automobiles, it is highly desirable to have movable windows. With reference to automobiles, windows are displaceable upwardly and downwardly relative to a door assembly by use of a manual crank or an electrically-driven window lifting mechanism. Many window lifting mechanisms include a scissoring linkage which transfers motion from a manual crank or electric drive to a window connected to the window lifting mechanism. The scissoring linkage is used in order to limit the movement of the window in a generally vertical direction. A cross member is attached to the scissoring linkage to provide a support for the movable window. Such a window lifting mechanism is disclosed in U.S. Pat. No. 5,513,468, which is hereby incorporated herein by reference in its entirety.

Mounting brackets or window lift brackets are often used to attach the movable window to the cross member attached to the scissoring linkage. These brackets generally are attached to a mounting edge of the window at two spaced apart locations and a portion of the bracket is attached to the window lifting cross member.

Many prior art brackets present problems in a movable window assembly, are difficult to manufacture, and are relatively expensive. Some prior art brackets are manufactured from a stamped strip of metal which is deformed to a specified bracket configuration. These deformed metal components are subject to damage and failure as the result of corrosion thereby providing a weak link in the movable window assembly.

With regard to the manufacturing of such prior art window lift brackets, many opportunities for complications and defects arise. Initially, a strip of metal is stamped or cut to a desired size. Next, the metal component is stamped, bored or drilled to provide through holes which will be used as described here and below. The stamped metal component is deformed to form a bracket having a generally "Y" shaped cross section. The deformed metal component must now be protected by painting, anodizing or other means to delay the corrosion process. Once protected, plastic mounted clips are positioned in a channel portion of the bracket and secured in the thru holes by use of a heat staking process. The base of the bracket is drilled for receiving a fastener which will be used to attach the bracket to the lift mechanism cross member.

In applying such prior art lift brackets to a window, an adhesive is disposed in the channel portion of the lift bracket and the lift bracket is attached to the mounted edge of a movable window. The window, with two or more brackets positioned thereon, is subjected to a heat curing process in order to cure the adhesive. A heat curing adhesive is used in order to properly adhere the adhesive to the surfaces of the bracket and window.

As may be understood from the description hereinabove, there are numerous opportunities for problems to arise in the manufacture of a window lift bracket as set forth by the prior art. For example, if the bracket is not properly formed, it may not properly fit on the window or function in the movable window assembly. In each step of the fabrication process a new operation, coating, or joining method is used, each presenting its own opportunity for problems.

For example, as mentioned, clips must be used with the deformed metal bracket in order to prevent the bracket from scratching the window glass and the protective coating on the window. The plastic clips are an individual piece part which must be designed, purchased, and managed in the manufacturing system. The clips are typically produced by selectively cutting an extruded plastic strip. Each clip must be cut to a generally precise dimension thereby requiring an additional inspection step. The clips must also be heat staked to the metal bracket. The heat staking process deforms a portion of the plastic clip over an abutting portion of the metal bracket. If the plastic portion is not properly melted, it may not be securely held to the metal bracket which could result in a release of the window from the bracket under certain circumstances. Clearly, it is not desirable to have a release of the window from the bracket.

Additionally, an adhesive is disposed in a channel portion of the metal bracket to secure the window to the bracket. The adhesive must be selected to attach or adhere to the metal bracket (or the protective surface of the metal bracket) and the window glass and/or coating. The numerous and diverse material properties involved can make selection of an appropriate adhesive somewhat difficult. Further, if the metal bracket begins to corrode, the corrosion could result in the adhesive detaching from the metal bracket.

As may be clear, there are numerous problems associated with the manufacture and use of metal window lift brackets as currently used in the prior art. As such, it is important to find a window lift bracket which will overcome the problems associated with the prior art devices.

A window lift bracket which overcomes many of the problems presented by some prior art window brackets can be found in U.S. Pat. No. 5,513,468, which has been incorporated herein in its entirety be reference hereinabove. The bracket which is disclosed in the '468 patent is also generally illustrated in FIG. 1 of the present application, as is designated with reference numeral 10. The bracket 10 includes a base 12 which is configured for attachment to a window lifting mechanism (see FIG. 1 of the '468 patent), and spaced apart sidewalls 14 which extend from the base 12 and define a channel 16 which receives an edge of the window (see FIGS. 1, 6 and 7 of the '468 patent). Each of the sidewalls 14 includes alternating protrusions 17 and depressions 18 which define a convoluted surface.

As described in the '468 patent, the convoluted surfaces increase the effective surface area of the inside surface of the sidewalls 14, thereby increasing the contact surface between an adhesive applied to the convoluted surfaces and the window which is disposed in the channel 16. As disclosed in the '468 patent, the bracket 10 also includes a groove 19 at the bottom of the channel 16 which provides even greater holding forces between the adhesive and the window. As disclosed in the '468 patent, the bracket 10 is preferably formed of a plastics material which allows the bracket to be integrally formed as a unitary, single-piece body. Such a configuration presents certain advantages, including certain manufacturing advantages.

While the bracket 10 disclosed in the '468 patent and illustrated in FIG. 1 of the present application presents several advantages over many prior art window brackets, the bracket 10 also presents a disadvantage. Specifically, the bracket 10 is configured such that when the window is installed in the bracket 10, and specifically in the channel 19 defined by the sidewalls 14, an interference fit results between the sidewalls 14 and the window. The interference fit tends to create high stresses in the bottom of the channel 16, which may cause the bracket 10 to fail.

An embodiment of the present invention essentially provides an improvement to the bracket disclosed in the '468 patent. Hence, the embodiment provides many of the same advantages as does the bracket disclosed in the '468 patent, while being directed to overcome the noted disadvantage-namely, eliminating the high stress area which is present in the bottom of the channel of the bracket disclosed in the '468 patent.

OBJECTS AND SUMMARY

A general object of an embodiment of the present invention is to provide a window lift bracket which will securely attach to a window and a window lifting mechanism.

Another object of an embodiment of the present invention is to provide a window lift bracket with a reduced stress area.

A still further object of the present invention is to provide a window lift bracket which is efficiently manufactured and eliminates numerous manufacturing steps and the parts required to manufacture a bracket.

Briefly, and in accordance with at least one of the foregoing, an embodiment of the present invention envisions a window lift bracket for attachment to a mounting edge of a movable window and which is connectable to a window lifting mechanism. The window lift bracket includes a base which is attachable to the window lifting mechanism and spaced apart portions extending from the base being positionable on either side of the movable window. The spaced apart portions define a channel therebetween. The window lift bracket includes at least one member, such as a flexible beam member, which is disposed generally in the channel for engaging the window when the window is disposed therein. Preferably, the engagement between the member and the window provides a reduced stress area at the bottom of the channel. Opposing surfaces of the spaced apart portions may provide convoluted surfaces, such as protrusions and depressions, which effectively increase the surface area to which the adhesive adheres, thereby improving the adhesion of the adhesive to the window bracket and the window.

BRIEF DESCRIPTION OF THE DRAWINGS

5

DESCRIPTION

Figure 1:
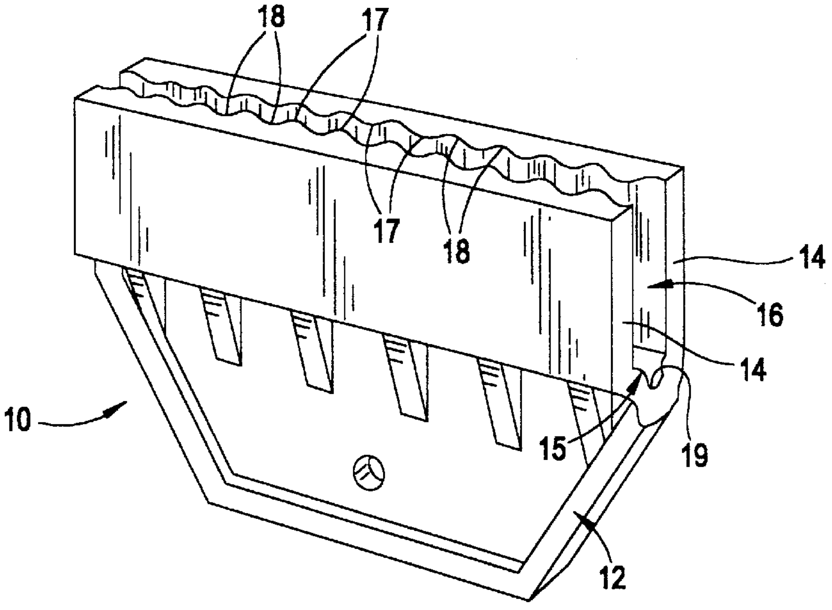
Prior Art FIG. 1
FIG. 1 is an enlarged perspective view of a prior art window lift bracket, which is disclosed in U.S. Pat. No. 5,513,468.
Figure 2:
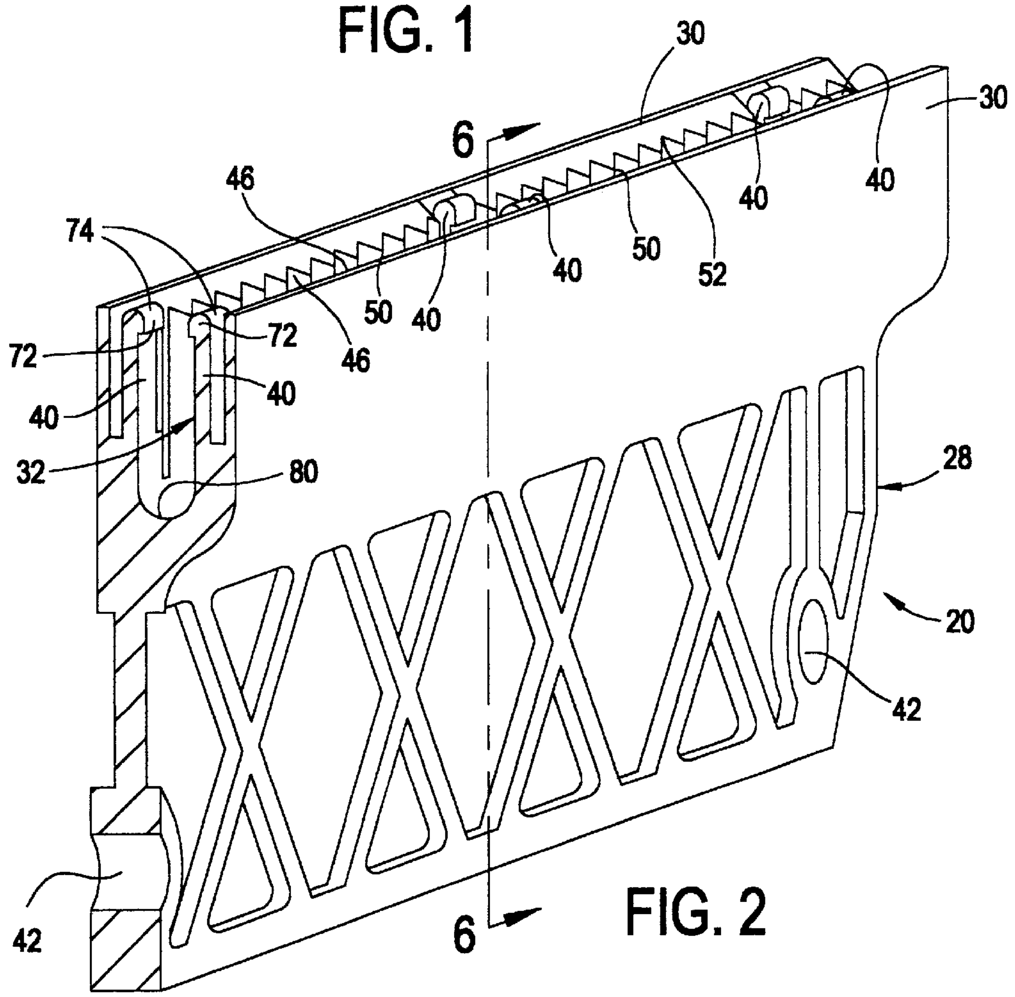
FIG. 2 is an enlarged perspective view of a portion of a window lift bracket, where the window lift bracket is in accordance with an embodiment of the present invention.

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

FIGS. 2–10 illustrate a window lift bracket 20 which is in accordance with an embodiment of the present invention. The window lift bracket 20 is similar to that which is disclosed in U.S. Pat. No. 5,513,468, which has been incorporated herein in its entirety be reference hereinabove. Like the bracket shown in FIG. 1 (and disclosed in the '468 patent), the bracket 20 illustrated in FIGS. 2–10 is configured for attachment to a window lifting mechanism 24 and a window 26 (see FIG. 3, for example), essentially providing a link between the window lifting mechanism 24 and the window 26. The bracket 20 illustrated in FIGS. 2–10 of the present application preferably includes a base 28 and spaced apart means, such as generally parallel sidewalls 30, which extend from the base 28, thereby defining a channel 32 which receives an edge 34 of the window 26. Preferably, the spaced apart means 30 provide convoluted surfaces which provide increased surface areas for an adhesive 36 to bond. Unlike the bracket 10 shown in FIG. 1 (and disclosed in the '468 patent), wherein an interference fit results between sidewalls 14 of the bracket 10 and the window when the window is disposed in the channel 16 between the sidewalls 14, the bracket 20 illustrated in FIGS. 2–10 includes a plurality of flexible beam members 40 which extend from the base 28 and are disposed generally in the channel 32. The flexible beam members 40 engage the window 26 when the window 26 is disposed in the channel 32, and the engagement between the flexible beam members 40 and the window 26 works to localize resulting stress at the flexible beam members 40, thereby reducing the stress which would otherwise be experienced at the bottom of the channel 32, such as in the bracket 10 shown in FIG. 1 (and disclosed in the '468 patent). All of this will be described more fully later herein.

Figure 3:
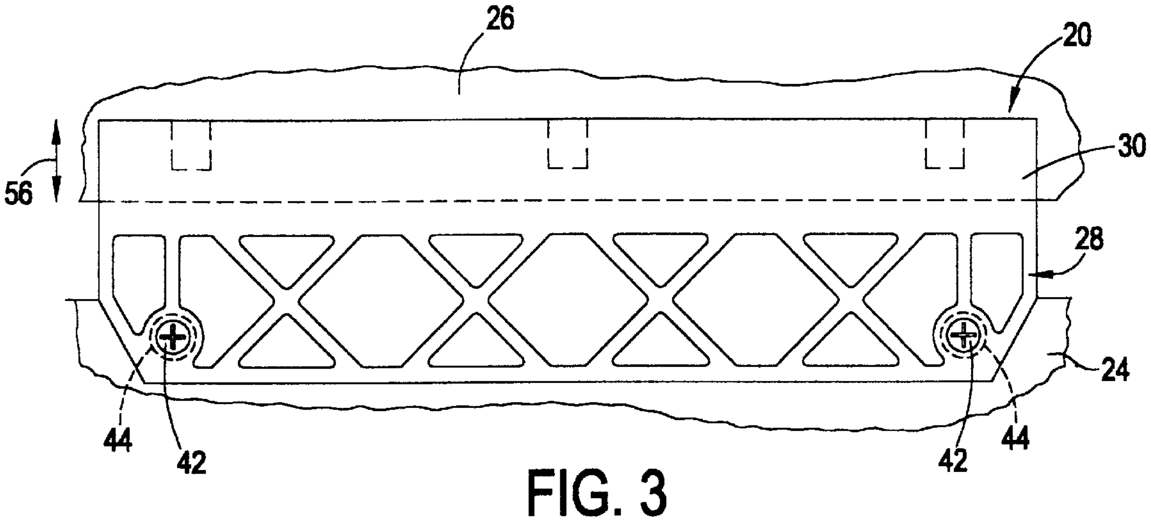
FIG. 3 is a front elevational view of the window lift bracket shown in FIG. 2, showing the entire bracket.
Figure 4:
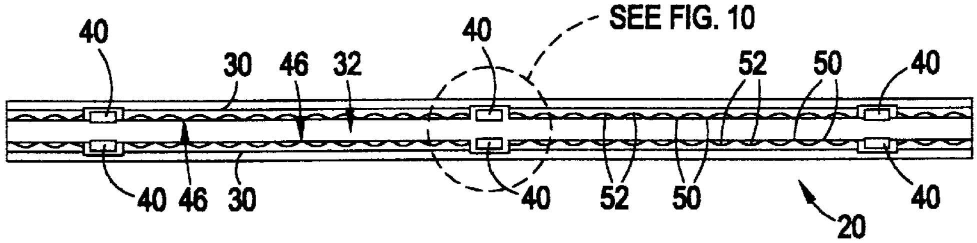
FIG. 4 is a top plan view of the window lift bracket shown in FIG. 3.
Figure 5:
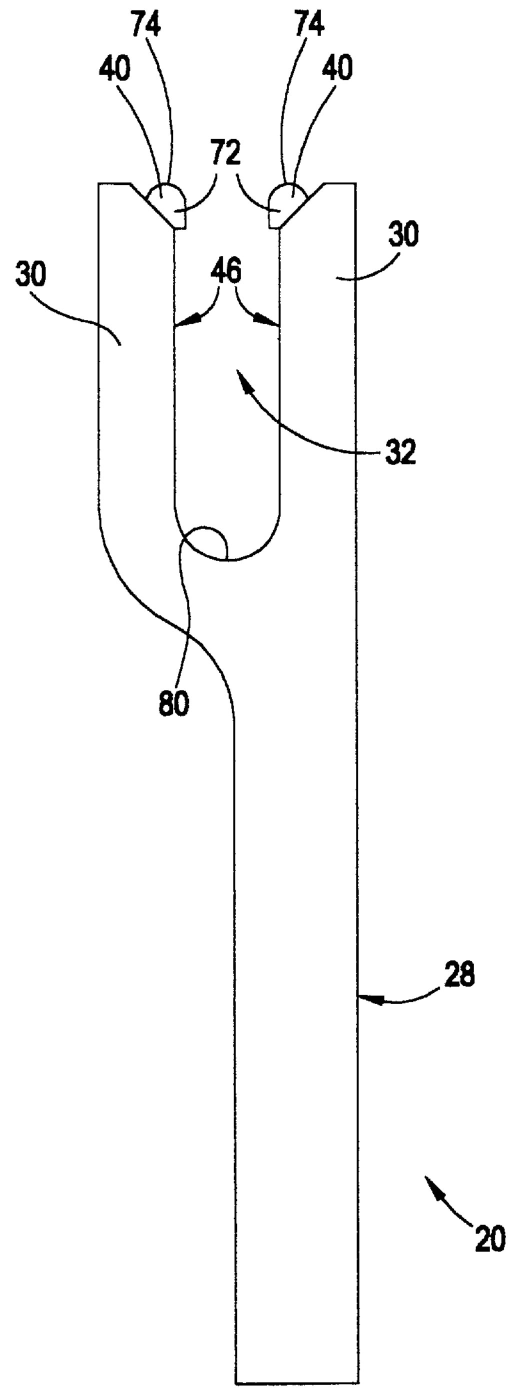
FIG. 5 is a side elevational view of the window lift bracket shown in FIG. 3.
Figure 6:
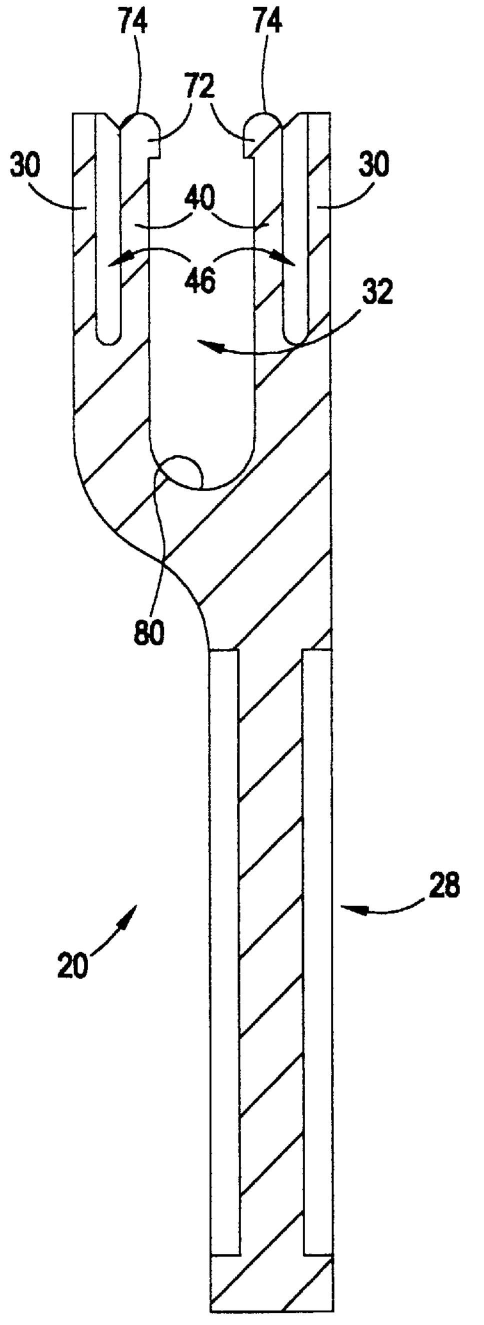
FIG. 6 is cross-sectional view of the window lift bracket shown in FIG. 3, taken along line 6—6 of FIG. 2.
Figure 7:
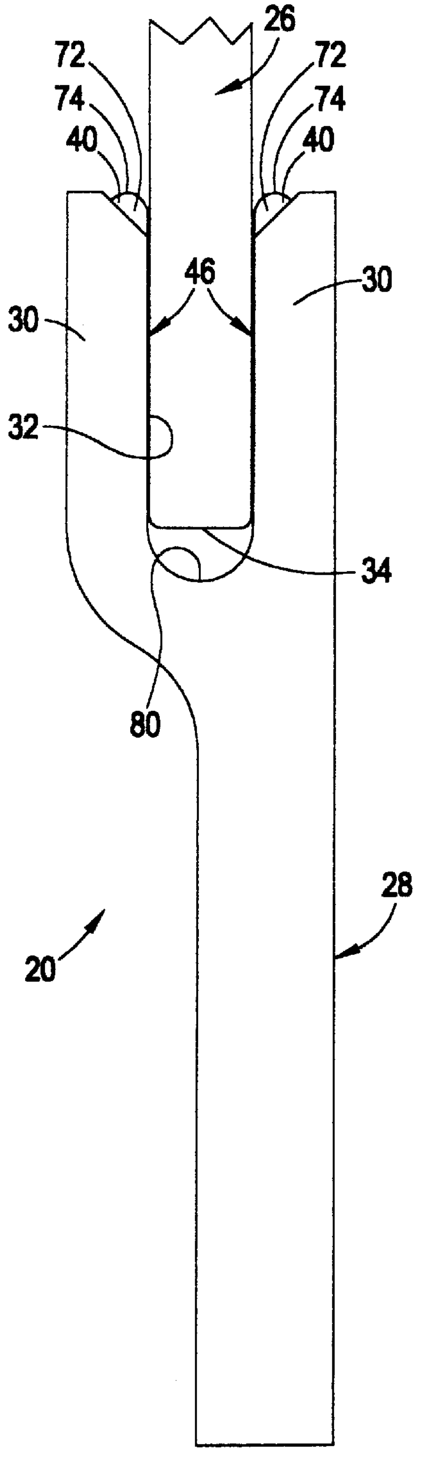
FIG. 7 is a side elevational view similar to FIG. 5, but showing the window disposed in a channel defined by the bracket.
Figure 8:
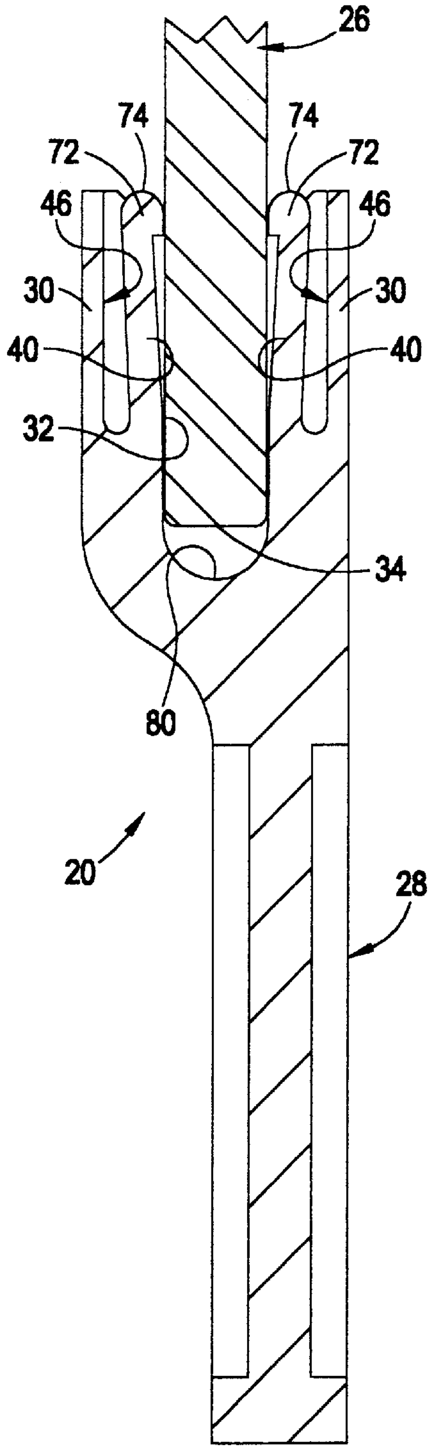
FIG. 8 is a cross-sectional view similar to FIG. 6, but showing a window disposed in the channel defined by the bracket.

As discussed above, preferably the window lift bracket 20 is configured to engage a window lifting mechanism 24. Specifically, preferably the base 28 of the window lift bracket 20 includes one or more bores 42 for receiving corresponding fasteners 44 (shown in phantom in FIG. 3) which secure the base to the window lifting mechanism 24, such as to a cross member of the window lifting mechanism 24. While only a portion of the window lifting mechanism 24 is shown in FIG. 3, and the window lifting mechanism 24 is omitted from the rest of the FIGS. for clarity, a window lifting mechanism 24 which may be employed with the window lift bracket 20 is disclosed in U.S. Pat. No. 5,513,468 (see specifically FIG. 1 of the '468 patent), and the '468 patent has been incorporated herein in its entirety be reference hereinabove.

As discussed above, the window lift bracket 20 is configured to receive an edge 34 of a window 26 and effectively provides a link between the window lifting mechanism 24 and the window 26. Preferably, the window lift bracket 20 is configured to be securely engaged with an edge 34 of the window 26, without scratching the window or a protective coating which is often applied to windows.

As shown, the window lift bracket 20 includes spaced apart means 30 which are attached to and extend from the base 28 for attaching the bracket 20 to a window 26. The spaced apart means 30 define a channel 32 therebetween in which the edge 34 of the window 26 is fitted Preferably, an inside surface 46 of the spaced apart means 30 provides a convoluted surface for adhesion to an adhesive 36.

The spaced apart means 30 are preferably formed as generally upstanding, spaced-apart sidewalls 30 which are attached to and extend from the base 28. Inside facing surfaces 46 of the sidewalls 30 preferably include protrusions 50 which are shaped as ridges, and corresponding depressions 52 which are shaped as troughs. Preferably, the ridges 50 and troughs 52 are generally parallel to the direction of travel of the window 26 (arrow 56 in FIG. 3 generally depicts a preferred direction of travel of the window 26). The ridges 50 and troughs 52 define a convoluted inside surface. The convoluted surfaces preferably increase the effective surface area of the inside surface 46 of the sidewalls 30, thereby increasing the contact surface between an adhesive 36 which is applied to the convoluted surfaces and to the window 26.

Preferably, the sidewalls 30 are spaced-apart such that when the window 26 is disposed in the channel 32, a gap (identified by reference numeral 60 in FIG. 10) exists between the sidewalls 30 and the window 26, and only the flexible beam members 40 contactably engage the window 26. The flexible beam members 40 provide that the stress on the sidewalls 30 is localized on the flexible beam members 40, and that the stress which would otherwise be experienced at the bottom of the channel 32 (i.e. proximate area 70 illustrated in FIG. 9) is reduced.

For example, the bracket 10 shown in FIG. 1 (and disclosed in the '468 patent) is configured to provide an interference fit between the sidewalls 14 of the bracket 10 and a window disposed in the channel 16. Such an interference fit provides a high stress area generally at the bottom of the channel (i.e. at area 15 shown in FIG. 1).

In contrast, the bracket 20 illustrated in FIGS. 2–10 includes flexible beam members 40 which engage the window 26, and a gap 60 (see FIG. 10) is preferably provided between the inside surfaces 46 of the sidewalls 30 and the window 26. Hence, the stresses are localized on the flexible beam members 40, and a high stress area is eliminated from the bottom of the channel 32 (i.e. at area 70 identified in FIG. 9). As shown in FIGS. 2, 5, 6 and 9, each of the flexible beam members 40 may include a hook portion 72 at an end 74 thereof, for contacting the window 26 which is disposed in the channel 32. Preferably, the flexible beam members 40 are also configured to allow the free flow of adhesive 36 along the inside surfaces 46 of the sidewalls 30, and the adhesive 36 does not leak from the bracket 20.

Figure 9:
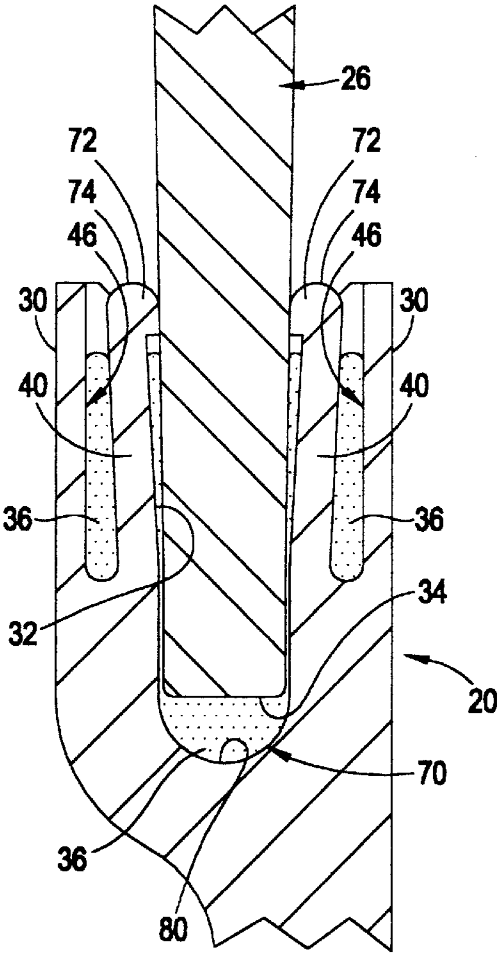
FIG. 9 is an enlargement of a top portion of FIG. 8, showing an adhesive disposed in the channel defined by the bracket.
Figure 10:
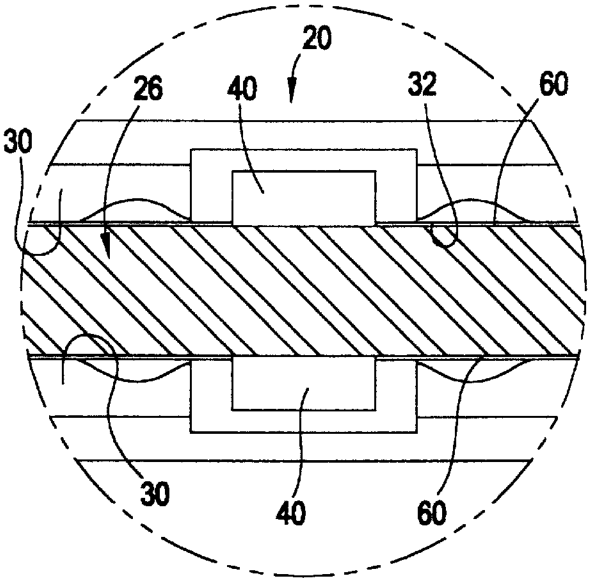
FIG. 10 is an enlargement of a middle portion of FIG. 4, showing the window disposed in the channel defined by the bracket, and showing the engagement of two flexible beam members of the bracket with the window.

As shown in FIG. 9, the adhesive 36 is preferably disposed in the channel 32 for contact between the inside surfaces 46 of the sidewalls 30 and the window 26. Preferably, the adhesive 36 is retained between the sidewalls 30 and the window 26, and the convoluted surfaces provide increased surface area for improved adhesion. As shown, the adhesive 36 is also disposed between the spaced apart sidewalls 30 and the flexible beam members 40.

In order to provide even greater holding forces between the adhesive 36, the bracket 20 and the window 26, a groove 80 may be formed in the bracket 20 generally at the bottom of the channel 32, between the sidewalls 30 for receiving the adhesive 36 therein. Preferably, the groove 80 generally runs the length of the bracket 20 to provide additional holding forces between the surface of the bracket 20 positioned proximate to the groove 80, the adhesive 36 retained within the groove 80, and the edge 34 of the window 26.

One type of adhesive which is used in the attachment of the present bracket 20 to a window 26 requires a heat curing process. As such, the adhesive 36 is applied between the window 26 and the bracket 20 forming bonds between the window 26 and the inside surfaces 46 of the sidewalls 30 and the groove 80. The window 26 and one or more attached window lift brackets define a movable window assembly which is subjected to a heated environment to cure the adhesive 36. In this regard, it is preferable to form the bracket 20 of a suitable plastics material which can withstand the temperature range required for heat curing the adhesive 36.

The bracket 20 is preferably formed of a plastics material which allows the bracket 20 to be integrally formed as unitary single piece body. A material such as injection molded glass filled nylon plastic may be used. Such material will provide the manufacturing benefits of plastic without compromising, and perhaps improving, the structural characteristics of the bracket 20.

Unitary forming of the bracket 20 eliminates numerous manufacturing steps and, perhaps, inspection steps required in some prior art brackets. Further, forming the bracket 20 of plastic eliminates the need for individually manufactured and assembled clips to prevent scratching the glass and protective coating of the window. As discussed above, the bracket 20 is preferably configured to be attached to a cross member of a window lifting mechanism 24 by one or more fasteners 44 which extend through bores 42 formed in the base 28 of the bracket 20. Use of fasteners 44 to attach the bracket 20 to the window lifting mechanism 24 helps to simplify the installation process and further reduces the weight of the overall vehicle assembly.

Preferably, the plastics material used in forming the bracket 20 will no t corrode, thereby eliminating corrosion failure which may occur in some prior art metal brackets. Additionally, providing that the bracket 20 is plastic eliminates the need for additional manufacturing steps such as coating of a metal bracket to delay the corrosion process. The plastics material greatly reduces the weight of the bracket 20 which may provide a noticeable cumulative effect since two brackets are often used per window which result in the use of eight brackets per vehicle thereby providing eight times the weight reduction per vehicle when comparing the plastic bracket to a prior art metal bracket.

While a preferred embodiment of the present invention is shown and described, it is envisioned that those skilled in the art may devise various modifications of the present invention without departing from the spirit and scope of the appended claims. The invention is not intended to be limited by the foregoing disclosure.

What is claimed is:

1. A window lift bracket which is configured for attachment to a mounting edge of a movable window and which is connectable to a window lifting mechanism, said window lift bracket comprising: a base which is attachable to the window lifting mechanism; spaced apart portions extending from the base being positionable on either side of the movable window, said spaced apart portions defining a channel therebetween; and at least one flexible beam member which is disposed generally in the channel and is configured to engage the window when the window is disposed therein, said flexible beam member configured to define a gap between one of said spaced apart portions and said flexible beam member.

2. The window lift bracket as recited in claim 1, wherein opposing surfaces of the spaced apart portions comprises convoluted surfaces.

3. The window lift bracket as recited in claim 2, wherein each of said convoluted surfaces comprises protrusions and depressions.

4. The window lift bracket as recited in claim 1, wherein said flexible beam member and said spaced apart portions are configured such that when said window is disposed in said channel, said flexible beam member contacts said window and said spaced apart portions do not contact said window.

5. The window lift bracket as recited in claim 1, further comprising a plurality of flexible beam members which are disposed generally in the channel and are configured to engage the window when the window is disposed therein.

6. The window lift bracket as recited in claim 5, wherein said flexible beam members are configured to define gaps between said spaced apart portions and said flexible beam members thereby allowing generally free flow of adhesive through said gaps and along said spaced apart portions.

7. The window lift bracket as recited in claim 1, wherein said base includes at least one bore for receiving a fastener to secure the base to the window lifting mechanism.

8. The window lift bracket as recited in claim 1, wherein said flexible beam member includes a hook portion which is configured to engage the window when the window is disposed in the channel.

9. The window lift bracket as recited in claim 1, further comprising a groove in a bottom of the channel, generally between said spaced apart portions.

10. The window lift bracket as recited in claim 1, wherein said window lift bracket is formed of plastic.

11. The window lift bracket as recited in claim 1, further comprising adhesive between at least one of said spaced apart portions and said flexible beam member.

12. A window lift bracket which is configured for attachment to a mounting edge of a movable window and which is connectable to a window lifting mechanism, said window lift bracket comprising: a base which is attachable to the window lifting mechanism; spaced apart sidewalls extending from the base being positionable on either side of the movable window, said spaced apart sidewalls defining a channel therebetween; and a plurality of flexible beam members which are disposed generally in the channel and are configured to engage the window when the window is disposed in the channel, wherein said spaced apart sidewalls and said flexible beam members are configured such that said flexible beam members contact said window when said window is disposed in said channel and said spaced apart sidewalls do not contact said window when said window is disposed in said channel, said flexible beam members configured to define gaps between said spaced apart sidewalls and said flexible beam members.

13. The window lift bracket as recited in claim 12, wherein opposing surfaces of the spaced apart sidewalls comprises convoluted surfaces.

14. The window lift bracket as recited in claim 13, wherein each of said convoluted surfaces comprises protrusions and depressions.

15. The window lift bracket as recited in claim 12, wherein said flexible beam members are configured to define gaps between said spaced apart sidewalls and said flexible beam members thereby allowing generally free flow of adhesive through said gaps and along said spaced apart sidewalls.

16. The window lift bracket as recited in claim 12, wherein said base includes at least one bore for receiving a fastener to secure the base to the window lifting mechanism.

17. The window lift bracket as recited in claim 12, wherein each of said flexible beam members includes a hook portion which is configured to engage the window when the window is disposed in the channel.

18. The window lift bracket as recited in claim 12, further comprising a groove in a bottom of the channel, generally between said spaced apart sidewalls.

19. The window lift bracket as recited in claim 12, further comprising adhesive between said spaced apart sidewalls and said flexible beam members.

* * * * *